US012799396B2

(12) United States Patent
Jang et al.

(10) Patent No.: US 12,799,396 B2
(45) Date of Patent: Nov. 17, 2026

(54) UPCONVERSION MULTICOLOR LIGHT-EMITTING POLYMER COMPOSITE, TRANSPARENT DISPLAY INCLUDING THE SAME AND METHOD FOR MANUFACTURING THE SAME

(71) Applicant: KOREA INSTITUTE OF SCIENCE AND TECHNOLOGY, Seoul (KR)

(72) Inventors: Ho Seong Jang, Seoul (KR); Jihoon Kyhm, Seoul (KR); Ja Yeon Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 566 days.

(21) Appl. No.: 18/469,891

(22) Filed: Sep. 19, 2023

(65) Prior Publication Data

US 2024/0117247 A1 Apr. 11, 2024

(30) Foreign Application Priority Data

Oct. 7, 2022 (KR) ........................ 10-2022-0128897

(51) Int. Cl.
*C09K 11/77* (2006.01)
*C09K 11/02* (2006.01)

(52) U.S. Cl.
CPC ........ *C09K 11/7773* (2013.01); *C09K 11/025* (2013.01)

(58) Field of Classification Search
CPC .......................... C09K 11/025; C09K 11/7773
See application file for complete search history.

(56) References Cited

U.S. PATENT DOCUMENTS

| | | | | |
|---|---|---|---|---|
| 2018/0016497 A1* | 1/2018 | Jang | ........................ | H10F 77/45 |
| 2020/0079994 A1* | 3/2020 | Jang | ........................ | C09K 11/06 |
| 2022/0064526 A1 | 3/2022 | Jang et al. | | |

FOREIGN PATENT DOCUMENTS

| | | | | |
|---|---|---|---|---|
| CN | 110878207 | | * | 3/2022 |
| CN | 114672303 | | * | 6/2022 |
| KR | 10-1327027 | B1 | | 11/2013 |
| KR | 10-1754777 | B1 | | 7/2017 |
| KR | 10-1792800 | B1 | | 11/2017 |
| KR | 10-2022-0027648 | A | | 3/2022 |

OTHER PUBLICATIONS

Hong, A-Ra, et al. "Orthogonal R/G/B Upconversion Luminescence-based Full-Color Tunable Upconversion Nanophosphors for Transparent Displays." Nano Letters 21.11 (2021): 4838-4844.
Deng, Renren, et al., "Temporal Full-Colour Tuning Through Non-Steady-State Upconversion," Nature Nanotechnology, Jan. 19, 2015, (32 Pages in English).
Mei, Qingsong, et al., "Manipulating Energy Migration Within Single Lanthanide Activator for Switchable Upconversion Emissions towards Bidirectional Photoactivation," Nature Communications, 2019, (39 Pages in English).

* cited by examiner

*Primary Examiner* — C Melissa Koslow
(74) *Attorney, Agent, or Firm* — NSIP Law

(57) ABSTRACT

An upconversion multicolor light-emitting polymer composite implements red, green, and blue colors at wavelengths in each specific region by mixing: an upconversion nanophosphor emitting light in red and blue colors at wavelengths in each specific region by absorbing the infrared light; an upconversion nanophosphor emitting light in green and blue colors at wavelengths in each specific region by absorbing the infrared light; and a polydimethylsiloxane (PDMS) polymer. Accordingly, a volumetric display with excellent color reproducibility may be realized with a simple manufacturing process.

15 Claims, 9 Drawing Sheets

UPCONVERSION MULTICOLOR LIGHT-EMITTING POLYMER COMPOSITE, TRANSPARENT DISPLAY INCLUDING THE SAME AND METHOD FOR MANUFACTURING THE SAME

CROSS REFERENCE TO RELATED APPLICATION

The present application claims priority to Korean Patent Application No. 2022-0128897, filed Oct. 7, 2022, the entire contents of which is incorporated herein for all purposes by this reference.

BACKGROUND OF THE INVENTION

Field of the Invention

The present disclosure relates to an upconversion multicolor light-emitting polymer composite, a transparent display including the same, and a method of manufacturing the same, and more particularly to a transparent polymer composite manufactured using an upconversion nanophosphor and a PDMS polymer.

DESCRIPTION OF GOVERNMENT-SPONSORED RESEARCH

This study was supported by the Korea Institute of Science and Technology, the Ministry of Science and ICT (Development of multi-scale mass transfer structure control material technology, Project No. 1711173305), the National Research Foundation of Korea, the Ministry of Science and ICT (Synthesis of highly stable perovskite quantum dot materials for color resist applications, Project No. 1711156654), and the National Research Foundation of Korea, the Ministry of Science and ICT (Development of highly efficient multicolor light-emitting upconversion nanophosphors for 3D volumetric display applications, Project No. 1711153297).

Description of the Related Art

Recently, new technologies such as virtual reality and augmented reality have been gaining attention, and to implement these technologies, display technologies capable of rendering three-dimensional images are necessary.

Among various methods for implementing three-dimensional images, volumetric displays can provide viewing capability that is difficult to achieve with holographic displays or glass-based stereoscopic displays.

To this end, technology has been applied to stack layers that emit light in blue, red, and green colors in order to implement different colors from a solid-state volumetric display using near-infrared lasers. However, this technology has a disadvantage of making an element design very complex.

Meanwhile, technology for mixing R/G/B multicolor light-emitting nanoparticles into a polymer composite has been introduced to overcome the disadvantages of a volumetric display based on stacking multiple layers. However, there are limitations to synthesizing nanoparticles that exhibit R/G/B full-color light emission, including the complexity of the manufacturing process.

To implement nanoparticles that exhibit R/G/B full-color light emission, multiple layers of multishells need to be formed around a core, and as the number of shells increases, the synthesis of the nanoparticles becomes more difficult and luminescence intensity may weaken.

Therefore, there is a need for a technology to manufacture a transparent polymer composite that is capable of achieving multicolor light emission more easily than the conventional technology, and a technology that is capable of exhibiting stronger multicolor light emission than upconversion nanoparticles with complex nanostructures that exhibit R/G/B light emission.

SUMMARY OF THE INVENTION

The present disclosure is directed to solving the above problems and the object of the present disclosure is to provide an upconversion multicolor light-emitting polymer composite.

Another object of the present disclosure is to provide a transparent display that includes the upconversion multicolor light-emitting polymer composite.

Still another object of the present disclosure is to provide a method of manufacturing the upconversion multicolor light-emitting polymer composite.

To achieve the above-mentioned object, an upconversion multicolor light-emitting polymer composite according to an exemplary embodiment implements red, green, and blue colors at wavelengths in each specific region of infrared light spectrum by mixing: an upconversion nanophosphor emitting light in red and blue colors at wavelengths in each specific region by absorbing the infrared light; an upconversion nanophosphor emitting light in green and blue colors at wavelengths in each specific region by absorbing the infrared light; and a polydimethylsiloxane (PDMS) polymer.

In an embodiment of the present disclosure, an upconversion nanophosphor that emits light in red and blue colors may include a nanoparticle with a core-shell-shell-shell structure, sequentially from a center.

In an embodiment of the present disclosure, the nanoparticle may include: core exhibiting light emission in red color; a first shell being an optically inactive layer to surround the core; a second shell being a light emitting layer to surround the first shell and exhibit light emission in blue color; and a third shell being a crystalline layer to protect the second shell.

In an embodiment of the present disclosure, an upconversion nanophosphor that emits light in green and blue colors may have a nanoparticle with a core-shell-shell-shell-shell structure, sequentially from a center.

In an embodiment of the present disclosure, the nanoparticle may include: a core exhibiting light emission in green color; a first shell being an absorbing layer to absorb light in each specific wavelength region; a second shell being an optically inactive layer to surround the first shell; a third shell being a light emitting layer to surround the second shell and exhibit light emission in blue color; and a fourth shell being a crystalline layer to protect the third shell.

In an embodiment of the present disclosure, the upconversion multicolor light-emitting polymer composite may exhibit light emission in red, green, and blue colors, respectively, when irradiated with infrared light having a peak of 1532 nm, 800 nm, and 980 nm.

In an embodiment of the present disclosure, the upconversion multicolor light-emitting polymer composite may include an upconversion nanophosphor emitting light in red and blue colors represented by Chemical Formula 1 below and an upconversion nanophosphor emitting light in green and blue colors represented by Chemical Formula 2 below.

$$NaEr_{1-x}F_4{:}Tm_x/NaYF_4/NaYb_{1-y}F_4{:}Tm_y/NaYF_4$$ [Chemical Formula 1]

Here, x is a real number selected from the range satisfying $0 \leq x \leq 0.3$ and y is $0 < y \leq 0.3$, $NaY_{1-a-b}F_4:Yb_a,Er_b/NaY_{1-c-d}F_4:Nd_c,Yb_d/NaYF_4/NaYb_{1-e}F_4:Tm_e/NaYF_4$ [Chemical Formula 2]

Here, a is a real number selected from the range satisfying $0 < a \leq 0.5$, b is a real number selected from the range satisfying $0 < b \leq 0.4$, c is a real number selected from the range satisfying $0 < c \leq 1.0$, d is a real number selected from the range satisfying $0 \leq d \leq 0.2$, where c and d are real numbers selected from the range satisfying $0 < c+d \leq 1$, and e is a real number selected from the range satisfying $0 < e \leq 0.3$.

A transparent display according to an embodiment for realizing another object of the present disclosure includes the upconversion multicolor light-emitting polymer composite.

A method of preparing an upconversion multicolor light-emitting polymer composite, according to an embodiment for realizing still another object of the present disclosure, the method includes: preparing an upconversion nanophosphor solution that absorbs infrared light to emit light in red and blue colors at wavelengths in each specific region; preparing an upconversion nanophosphor solution that absorbs the infrared light to emit light in green and blue colors at wavelengths in each specific region; preparing a mixed solution by mixing the prepared upconversion nanophosphor solution emitting light in red and blue colors with the upconversion nanophosphor solution emitting light in green and blue colors; and mixing the prepared mixed solution with a polydimethylsiloxane (PDMS) polymer.

In an embodiment of the present disclosure, the preparing of the upconversion nanophosphor solution emitting light in red and blue colors may include: creating a core exhibiting light emission in red color; creating a first shell being an optically inert layer to surround the core; creating a second shell being a light emitting layer to surround the first shell and exhibit light emission in blue color; and creating a third shell being a crystalline layer to protect the second shell.

In an embodiment of the present disclosure, the preparing of the upconversion nanophosphor solution emitting light in green and blue colors may include: creating a core exhibiting light emission in green color; creating a first shell being an absorbing layer to absorb wavelengths in each specific region; creating a second shell being an optically inactive layer to surround the first shell; creating a third shell being a light-emitting layer to surround the second shell and exhibit light emission in a blue color; and creating a fourth shell being a crystalline layer to protect the third shell.

In an embodiment of the present disclosure, the preparing of the upconversion nanophosphor solution emitting light in red and blue colors may further include: diluting the prepared nanophosphor solution by ½.

In an embodiment of the present disclosure, the preparing of the upconversion nanophosphor solution emitting light in green and blue colors may further include: diluting the prepared nanophosphor solution by ½.

In an embodiment of the present disclosure, the preparing of the mixed solution may further include: mixing the upconversion nanophosphor solution emitting light in red and blue colors with the upconversion nanophosphor solution emitting light in green and blue colors in a 1:2 ratio.

In an embodiment of the present disclosure, in the preparing of the mixed solution, an upconversion nanophosphor emitting light in red and blue colors represented by Chemical Formula 1 below may be mixed with an upconversion nanophosphor emitting light in green and blue colors represented by Chemical Formula 2 below.

$NaEr_{1-x}F_4:Tm_x/NaYF_4/NaYb_{1-y}F_4:Tm_y/NaYF_4$ [Chemical Formula 1]

Here, x is a real number selected from the range satisfying $0 \leq x \leq 0.3$ and y is $0 < y \leq 0.3$, $NaY_{1-a-b}F_4:Yb_a,Er_b/NaY_{1-c-d}F_4:Nd_c,Yb_d/NaYF_4/NaYb_{1-e}F_4:Tm_e/NaYF_4$ [Chemical Formula 2]

Here, a is a real number selected from the range satisfying $0 < a \leq 0.5$, b is a real number selected from the range satisfying $0 < b \leq 0.4$, c is a real number selected from the range satisfying $0 < c \leq 1.0$, d is a real number selected from the range satisfying $0 \leq d \leq 0.2$, where c and d are real numbers selected from the range satisfying $0 < c+d \leq 1$, and e is a real number selected from the range satisfying $0 < e \leq 0.3$.

Therefore, the upconversion multicolor light-emitting polymer composite, which is manufactured by mixing an upconversion nanophosphor solution that absorbs infrared light and emits red and blue at wavelengths in each specific region and an upconversion nanophosphor solution that absorbs infrared light and emits green and blue at wavelengths in each specific region, may be manufactured by a simple process and implements a volumetric display with excellent color reproducibility.

DETAILED DESCRIPTION OF THE INVENTION

Figure 1A:
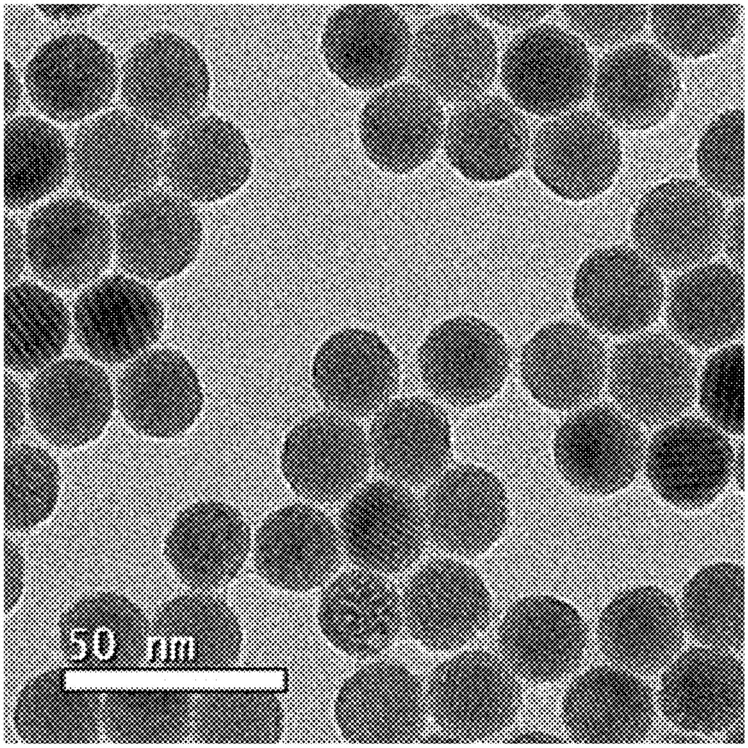
FIGS. 1A to 1D are transmission electron microscope images of nanoparticles of a core or a core-shell-shell-shell structure, according to an embodiment of the present disclosure.

The following detailed description of the present disclosure will be made with reference to the accompanying drawings illustrating specific exemplary embodiments for carrying out the present disclosure. These exemplary embodiments will be described in detail enough to carry out the present disclosure by those skilled in the art. It should be understood that various exemplary embodiments of the present disclosure are different from one another but need not be mutually exclusive. For example, particular shapes, structures, and characteristics described herein in respect to one exemplary embodiment may be implemented in other exemplary embodiments without departing from the spirit and scope of the present disclosure. In addition, it should be understood that the position or arrangement of each constituent element in the respective disclosed exemplary embodiments may be changed without departing from the spirit and scope of the present disclosure. Therefore, the following detailed description is not considered as having limited meanings, and the scope of the present disclosure, if adequately explained, is limited only by the appended claims as well as all the scopes equivalent to the appended claims. Like reference numerals in the drawings refer to the same or similar functions throughout several aspects.

Hereinafter, exemplary embodiments of the present disclosure will be described in detail with reference to the drawings.

Synthesizing nanoparticles that implement light emission in red (R), green (G), and blue (B) colors from a single nanoparticle requires designing nanoparticles with very complex structures, and it is very challenging to achieve strong emission of all three colors.

Accordingly, the present disclosure provides a transparent polymer composite that is capable of emitting light in red, green, and blue colors by mixing two types of nanoparticles that are capable of emitting two strong colors.

An upconversion multicolor light-emitting polymer composite according to the present disclosure is manufactured by mixing nanophosphors that absorb infrared light and emit light in red and blue colors at wavelengths in each specific region with nanophosphors that absorb infrared light and emit light in green and blue colors at wavelengths in each specific region.

In addition, the upconversion multicolor light-emitting polymer composite is a transparent composite manufactured by mixing polydimethylsiloxane (PDMS) polymers and others to implement red, green, and blue colors at wavelengths in each specific region of the Infrared.

In an embodiment, the upconversion multicolor light-emitting polymer composite according to the present disclosure is produced by mixing upconversion nanoparticles that emit light in red color when absorbing about 1532 nm infrared light and emit light in blue color when absorbing about 980 nm infrared light with upconversion nanoparticles that emit light in green color when absorbing about 800 nm infrared light and emit light in blue color when absorbing about 980 nm infrared light.

The upconversion multicolor light-emitting polymer composite according to the present disclosure is capable of absorbing about 1532 nm, about 800 nm, and about 980 nm infrared light to emit light in red, green, and blue colors, respectively. In addition, the upconversion multicolor light-emitting polymer composite is a transparent polymer composite, which may be applied to color displays or transparent displays. In addition, the upconversion multicolor light-emitting polymer composite may also be applied to volumetric displays or head-up displays (HUDs) in vehicles.

An upconversion nanophosphor that emits light in red and blue colors may have a nanoparticle with a core-shell-shell-shell structure, sequentially from a center.

For example, a nanoparticle constituting an upconversion nanophosphor that emits light in red and blue colors may have a structure that has a core that exhibits light emission in red color, a first shell that is an optically inactive layer that surrounds the core, a second shell that is a light emitting layer that surrounds the first shell and exhibits light emission in blue color, and a third shell that is a crystalline layer that protects the second shell.

An upconversion nanophosphor that emits light in green and blue colors may have a nanoparticle with a core-shell-shell-shell-shell structure, sequentially from a center.

For example, a nanoparticle constituting an upconversion nanophosphor that emits light in green and blue colors may have the structure that have a core that exhibits light emission in green color, a first shell that is an absorbing layer that absorbs wavelengths in each specific region, a second shell that is an optically inactive layer that surrounds the first shell, a third shell that is a light emitting layer that surrounds the second shell and exhibits light emission in blue color, and a fourth shell that is a crystalline layer that protects the third shell.

FIGS. 1A to 1D are transmission electron microscope images of nanoparticles of a core or a core-shell-shell-shell structure, according to an embodiment of the present disclosure.

Hereinafter, with reference to FIGS. 1A to 1D, a method of manufacturing a nanophosphor that emits light in red and blue colors is described according to an embodiment of the present disclosure.

First, according to an embodiment, an upconversion core nanophosphor doped with a $Tm^{3+}$ and emitting light in red color is prepared (see FIG. 1A). For example, $NaErF_4$:$Tm^{3+}$ nanoparticle doped with about 0.005 mmol of $Tm^{3+}$ may be prepared.

About 0.995 mmol of erbium chloride hexahydrate ($ErCl_3 \cdot 6H_2O$) and about 0.005 mmol of thulium chloride hexahydrate ($TmCl_3 \cdot 6H_2O$) were mixed with a solution including oleic acid and 1-octadecene, and a mixed solution including a lanthanide complex was prepared by heat treatment at about 150° C. for about 30 minutes (first mixed solution preparation step).

About 10 ml of a methanol solution including about 2.5 mmol of sodium hydroxide and about 4 mmol of ammonium fluoride was prepared (second mixed solution preparation step), and then mixed into the first mixed solution (reaction solution preparation step).

After being thoroughly mixed, methanol was removed and heat treated under an inert gas atmosphere. Preferably, the heat treatment temperature is about 200 to 370° C. and the heat treatment time is about 10 minutes to 4 hours (nanoparticle formation step).

After the heat treatment process and cooling to room temperature, nanophosphors in a colloidal state is obtained. The prepared nanophosphors were washed with acetone or ethanol and distributed in non-polar solvents such as hexane, toluene, and chloroform for storage.

FIG. 1A is a transmission electron microscope image of the upconversion nanophosphors prepared through the process described above, and it was confirmed that core nanophosphors with uniform size and shape were synthesized.

Figure 1B:
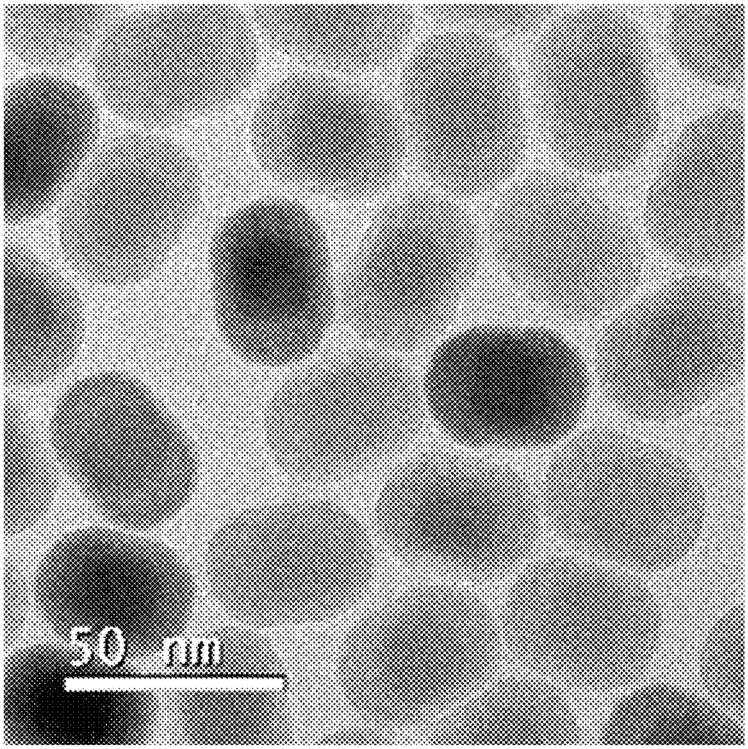

Then, according to an embodiment, upconversion nanophosphors with a core-shell structure through fluoride shell formation are prepared (see FIG. 1B).

Using the $NaErF_4$:$Tm^{3+}$ nanoparticle prepared according to the embodiment in FIG. 1A as a core, a nanophosphor with a core-shell ($NaErF_4$:$Tm^{3+}$/$NaYF_4$) structure including a fluoride-based compound was prepared.

Accordingly, the shell prepared may be a crystalline shell represented by chemical formula $NaYF_4$. First, about 2.5 mmol of yttrium chloride hexahydrate ($YCl_3 \cdot 6H_2O$) was mixed with a solution including oleic acid and 1-octadecene and heat treated at about 150° C. for about 30 minutes to prepare a mixed solution including a lanthanide complex (first mixed solution preparation step).

The first mixed solution was mixed with a solution including $NaErF_4$:$Tm^{3+}$ nanoparticles prepared according to the embodiment in FIG. 1A to prepare a second mixed solution (second mixed solution preparation step).

About 25 ml of a methanol solution including about 6.25 mmol of sodium hydroxide and about 10 mmol of ammonium fluoride was prepared in the second mixing solution (third mixing solution preparation step), and then mixed into the mixed solution including the lanthanide complex (reaction solution preparation step).

After being thoroughly mixed, methanol was removed and heat treated under an inert gas atmosphere. Preferably, the heat treatment temperature is about 200 to 370° C. and the heat treatment time is about 10 minutes to 4 hours (nanoparticle formation step).

After the heat treatment process and cooling to room temperature, nanophosphors in a colloidal state is obtained. The prepared nanophosphors were washed with acetone or ethanol and distributed in non-polar solvents such as hexane, toluene, and chloroform for storage.

FIG. 1B is a transmission electron microscope image of the core-shell upconversion nanophosphors prepared through the process described above, and it was confirmed that core-shell upconversion nanophosphors with uniform size and shape were synthesized.

Figure 1C:
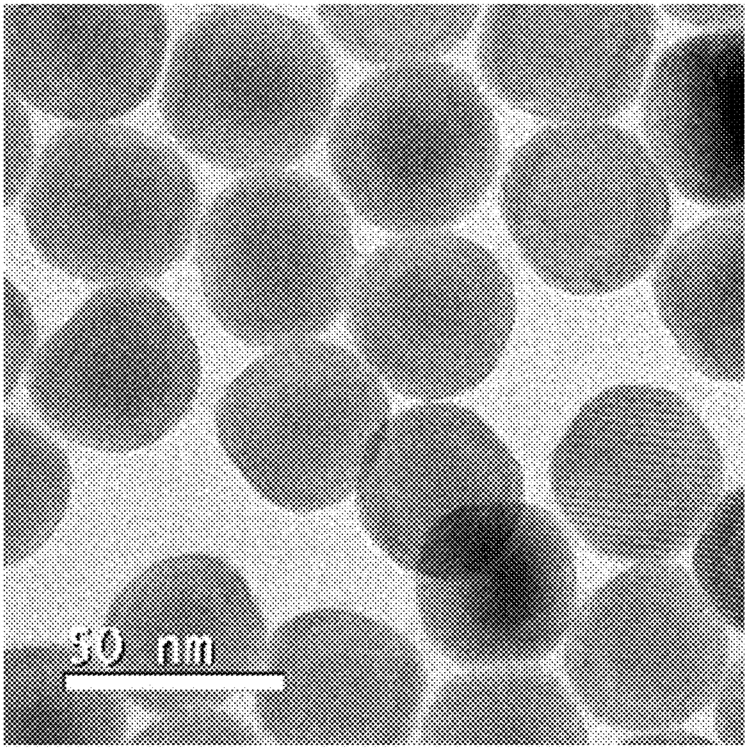

Then, according to an embodiment, upconversion nanophosphors with a core-shell-shell structure are prepared (see FIG. 1C).

Using the $NaErF_4$:$Tm^{3+}$/$NaYF_4$ nanoparticle prepared according to the embodiment in FIG. 1B as a core, a nanophosphor with a core-shell-shell structure including $NaYbF_4$:$Tm^{3+}$ compound was prepared. The prepared $NaYbF_4$:$Tm^{3+}$ compound may be understood as, for example, a $NaYb_{0.99}F_4$:$Tm^{3+}{}_{0.01}$ compound. In addition, the shell including the $NaYbF_4$:$Tm^{3+}$ compound may be a shell emitting light in blue color.

About 2.97 mmol of ytterbium chloride hexahydrate ($YbCl_3 \cdot 6H_2O$) and about 0.03 mmol of thulium chloride hexahydrate ($TmCl_3 \cdot 6H_2O$) were mixed with a solution including oleic acid and 1-octadecene, and a mixed solution including a lanthanide complex was prepared by heat treatment at about 150° C. for about 30 minutes (first mixed solution preparation step).

The first mixed solution was mixed with a solution including $NaErF_4$:$Tm^{3+}$/$NaYF_4$ nanoparticles prepared according to the embodiment in FIG. 1B to prepare a second mixed solution (second mixed solution preparation step).

About 30 ml of a methanol solution including about 7.5 mmol of sodium hydroxide and about 12 mmol of ammonium fluoride was prepared (third mixing solution preparation step), and then mixed into the second mixed solution including the lanthanide complex (reaction solution preparation step).

After being thoroughly mixed, methanol was removed and heat treated under an inert gas atmosphere. Preferably, the heat treatment temperature is about 200 to 370° C. and the heat treatment time is about 10 minutes to 4 hours (nanoparticle formation step).

After the heat treatment process and cooling to room temperature, nanophosphors in a colloidal state is obtained. The prepared nanophosphors were washed with acetone or ethanol and distributed in non-polar solvents such as hexane, toluene, and chloroform for storage.

FIG. 1C illustrated a transmission electron microscope image of the upconversion nanophosphors with the core-shell-shell structure synthesized through the process described above. It could be confirmed from the transmission electron microscope image that the particles further increased in size due to the formation of a second shell around the core-shell.

Figure 1D:
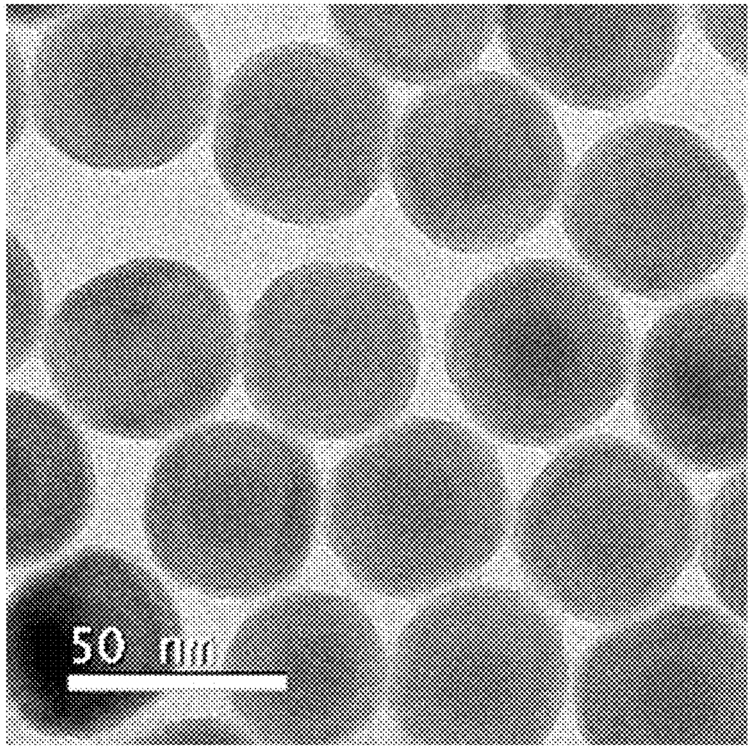

Then, according to an embodiment, upconversion nanophosphors with a core-shell-shell-shell structure are prepared (see FIG. 1D).

Using the $NaErF_4$:$Tm^{3+}$/$NaYF_4$/$NaYbF_4$:$Tm^{3+}$ nanoparticle prepared according to the embodiment in FIG. 1C as a core, a nanophosphor with a core-shell-shell-shell ($NaErF_4$:$Tm^{3+}$/$NaYF_4$/$NaYbF_4$:$Tm^{3+}$/$NaYF_4$) structure including $NaYF_4$ compound was prepared.

Here, the shell prepared may be a crystalline shell represented by a chemical formula $NaYF_4$. First, about 1 mmol of yttrium chloride hexahydrate ($YCl_3 \cdot 6H_2O$) was mixed with a solution including oleic acid and 1-octadecene and heat treated at about 150° C. for about 30 minutes to prepare a mixed solution including a lanthanide complex (first mixed solution preparation step).

The first mixed solution was mixed with a solution including $NaErF_4$:$Tm^{3+}$/$NaYF_4$/$NaYbF_4$:$Tm^{3+}$ nanoparticles prepared according to the embodiment in FIG. 1C to prepare a second mixed solution (second mixed solution preparation step).

About 10 ml of a methanol solution including about 2.5 mmol of sodium hydroxide and about 4 mmol of ammonium fluoride was prepared (third mixing solution preparation step), and then mixed into the second mixed solution including the lanthanide complex (reaction solution preparation step).

After being thoroughly mixed, methanol was removed and heat treated under an inert gas atmosphere. Preferably, the heat treatment temperature is about 200 to 370° C. and the heat treatment time is about 10 minutes to 4 hours (nanoparticle formation step).

After the heat treatment process and cooling to room temperature, nanophosphors in a colloidal state is obtained. The prepared nanophosphors were washed with acetone or ethanol and distributed in non-polar solvents such as hexane, toluene, and chloroform for storage.

FIG. 1D illustrated a transmission electron microscope image of the upconversion nanophosphors with the core-shell-shell-shell structure synthesized through the process described above. It could be confirmed from the transmission electron microscope image that the particles further increased in size due to the formation of a shell around the core-shell-shell.

FIG. 2 illustrates PL spectra conditions of each wavelength for the upconversion nanoparticle with the core-shell-shell-shell structure prepared according to the embodiment in FIG. 1.

Figure 2A:
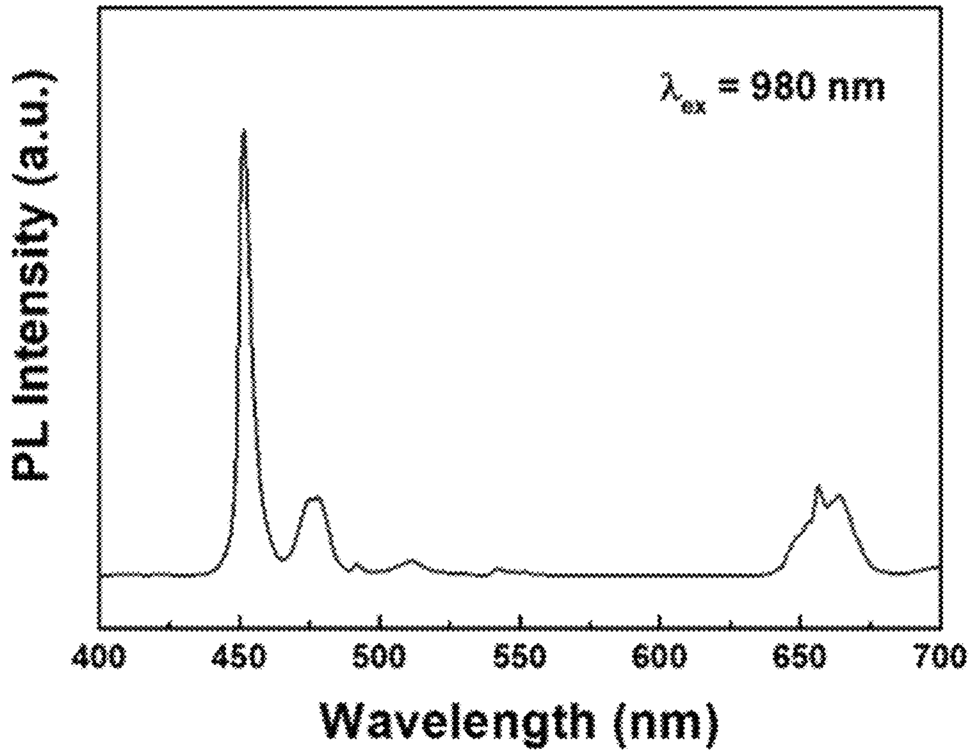
FIG. 2A is a PL spectrum of a nanoparticle with a core-shell-shell-shell structure under 980 nm near-infrared excitation according to an embodiment of the present disclosure.
Figure 2B:
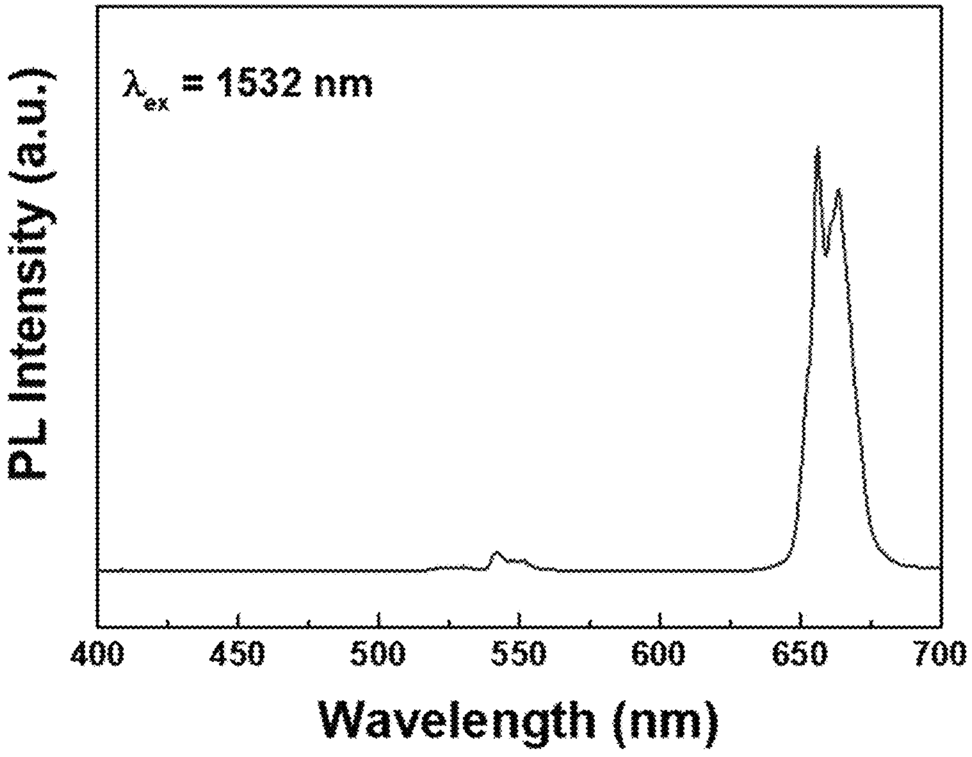
FIG. 2B is a PL spectrum of a nanoparticle with a core-shell-shell-shell structure under 1532 nm near-infrared excitation according to an embodiment of the present disclosure.

With reference to FIG. 2A, it can be seen that under near-infrared light excitation with 980 nm, the upconversion nanophosphor with the core-shell-shell-shell structure exhibits a strong light emission peak of blue color. In contrast, with reference to FIG. 2B, PL spectrum under near-infrared light excitation with 1532 nm is illustrated, and it can be seen that the upconversion nanophosphor with the core-shell-shell-shell structure exhibits a strong light emission peak of red color. It can be seen that the upconversion nanophosphor with the core-shell-shell-shell structure exhibit light emission of blue and red colors, respectively, when irradiated with 980 nm and 1532 nm near-infrared light-emitting lasers.

FIGS. 3A to 3E are transmission electron microscope images of nanoparticles of a core or a core-shell-shell-shell-shell structure, according to an embodiment of the present disclosure.

Hereinafter, with reference to FIGS. 3A to 3E, a method of manufacturing a nanophosphor that emits light in green and blue colors is described according to an embodiment of the present disclosure.

Figure 3A:
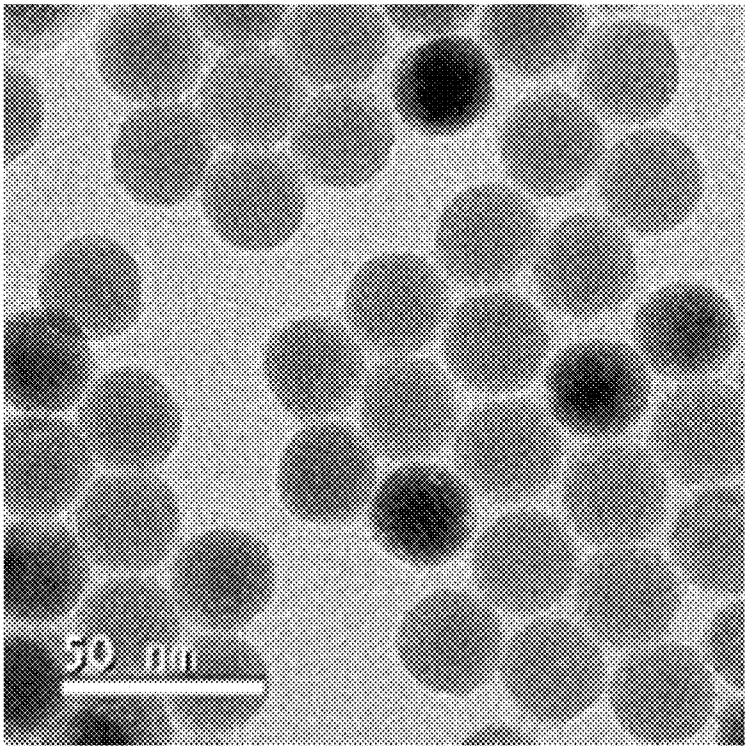
FIGS. 3A to 3E are transmission electron microscope images of nanoparticles of a core or a core-shell-shell-shell-shell structure, according to an embodiment of the present disclosure.

First, according to an embodiment, an upconversion core nanophosphor doped with a $Yb^{3+}$ and $Er^{3+}$ and emitting light in green color is prepared (see FIG. 3A). For example, about 0.18 mmol of $Yb^{3+}$ and about 0.02 mmol of $Er^{3+}$ doped $NaYF_4:Yb^{3+},Er^{3+}$ nanoparticle may be prepared.

About 0.8 mmol of yttrium chloride hexahydrate ($YCl_3 \cdot 6H_2O$), about 0.18 mmol of ytterbium chloride hexahydrate ($YbCl_3 \cdot 6H_2O$), and about 0.02 mmol of erbium chloride hexahydrate ($ErCl_3 \cdot 6H_2O$) were mixed with a solution including oleic acid and 1-octadecene and heat treated at about 150° C. for 30 minutes to prepare a mixed solution including a lanthanide complex (first mixed solution preparation step).

About 10 ml of a methanol solution including about 2.5 mmol of sodium hydroxide and about 4 mmol of ammonium fluoride was prepared (second mixed solution preparation step), and then mixed into the first mixed solution (reaction solution preparation step).

After being thoroughly mixed, methanol was removed and heat treated under an inert gas atmosphere. Preferably, the heat treatment temperature is about 200 to 370° C. and the heat treatment time is about 10 minutes to 4 hours (nanoparticle formation step).

After the heat treatment process and cooling to room temperature, nanophosphors in a colloidal state is obtained. The prepared nanophosphors were washed with acetone or ethanol and distributed in non-polar solvents such as hexane, toluene, and chloroform for storage.

FIG. 3A is a transmission electron microscope image of the upconversion nanophosphors prepared through the process described above, and it was confirmed that core nanophosphors with uniform size and shape were synthesized.

Figure 3B:
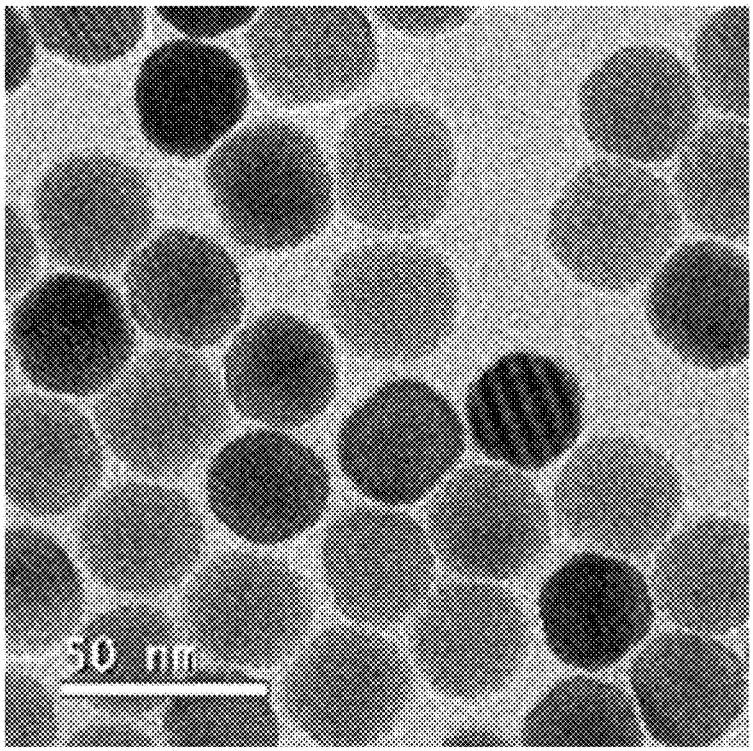

Then, according to an embodiment, upconversion nanophosphors with a core-shell structure are prepared (see FIG. 3B).

Using the $NaYF_4:Yb^{3+},Er^{3+}$ nanoparticle prepared according to the embodiment of FIG. 3A as a core, a nanophosphor with a core-shell ($NaYF_4:Yb^{3+},Er^{3+}/NaYF_4:Nd^{3+},Yb^{3+}$) structure including a fluoride-based compound was prepared. Here, the shell prepared may be a crystalline shell represented by a chemical formula $NaYF_4:Nd^{3+},Yb^{3+}$.

First, about 0.36 mmol of yttrium chloride hexahydrate ($YCl_3 \cdot 6H_2O$), about 0.18 mmol of neodymium chloride hexahydrate ($NdCl_3 \cdot 6H_2O$), and about 0.06 mmol of ytterbium chloride hexahydrate ($YbCl_3 \cdot 6H_2O$) were mixed with a solution including oleic acid and 1-octadecene and heat treated at about 150° C. for 30 minutes to prepare a mixed solution including a lanthanide complex (first mixed solution preparation step).

The first mixed solution was mixed with a solution including $NaYF_4:Yb^{3+},Er^{3+}$ nanoparticles prepared according to the embodiment in FIG. 3A to prepare a second mixed solution (second mixed solution preparation step).

About 6 ml of a methanol solution including about 1.5 mmol of sodium hydroxide and about 2.4 mmol of ammonium fluoride was prepared in the second mixing solution (third mixing solution preparation step), and then mixed into the mixed solution including the lanthanide complex (reaction solution preparation step).

After being thoroughly mixed, methanol was removed and heat treated under an inert gas atmosphere. Preferably, the heat treatment temperature is about 200 to 370° C. and the heat treatment time is about 10 minutes to 4 hours (nanoparticle formation step).

After the heat treatment process and cooling to room temperature, nanophosphors in a colloidal state is obtained. The prepared nanophosphors were washed with acetone or ethanol and distributed in non-polar solvents such as hexane, toluene, and chloroform for storage.

FIG. 3B is a transmission electron microscope image of the core-shell upconversion nanophosphors prepared through the process described above, and it was confirmed that core-shell upconversion nanophosphors with uniform size and shape were synthesized.

Figure 3C:
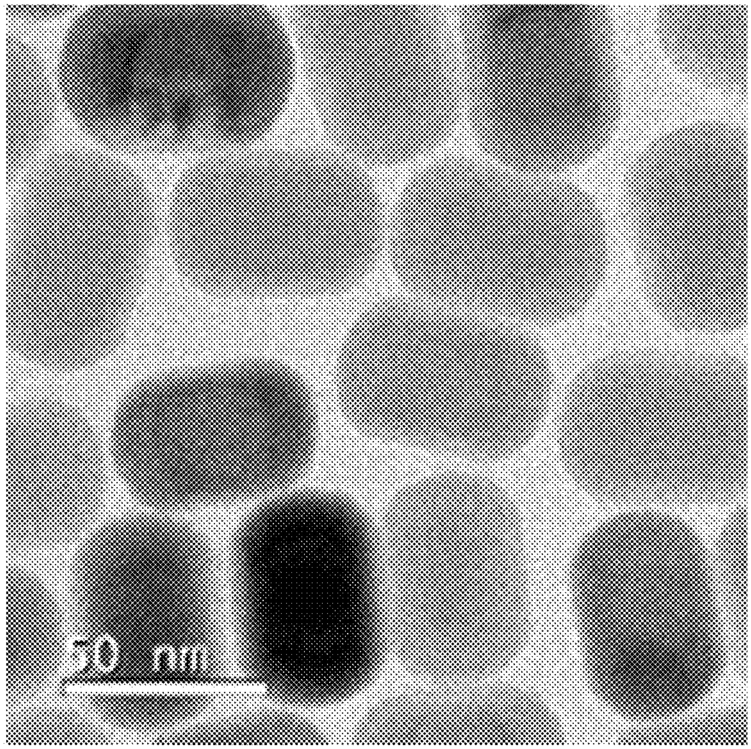

Then, according to an embodiment, upconversion nanophosphors with a core-shell-shell structure are prepared (see FIG. 3C).

Using the $NaYF_4:Yb^{3+},Er^{3+}/NaYF_4:Nd^{3+},Yb^{3+}$ core-shell nanoparticle illustrated in FIG. 3B as a core, a nanophosphor with a core-shell-shell structure including $NaYF_4$ compound was prepared.

About 2.5 mmol of yttrium chloride hexahydrate ($YCl_3 \cdot 6H_2O$) was mixed with a solution including oleic acid and 1-octadecene and heat treated at about 150° C. for about 30 minutes to prepare a mixed solution including a lanthanide complex (first mixed solution preparation step).

The first mixed solution was mixed with a solution including $NaYF_4:Yb^{3+},Er^{3+}/NaYF_4:Nd^{3+},Yb^{3+}$ nanoparticles prepared according to the embodiment in FIG. 3B to prepare a second mixed solution (second mixed solution preparation step).

About 25 ml of a methanol solution including about 6.25 mmol of sodium hydroxide and about 10 mmol of ammonium fluoride was prepared (third mixing solution preparation step), and then mixed into the second mixed solution including the lanthanide complex (reaction solution preparation step).

After being thoroughly mixed, methanol was removed and heat treated under an inert gas atmosphere. Preferably, the heat treatment temperature is about 200 to 370° C. and the heat treatment time is about 10 minutes to 4 hours (nanoparticle formation step).

After the heat treatment process and cooling to room temperature, nanophosphors in a colloidal state is obtained. The prepared nanophosphors were washed with acetone or ethanol and distributed in non-polar solvents such as hexane, toluene, and chloroform for storage.

FIG. 3C illustrated a transmission electron microscope image of the upconversion nanophosphors with the core-shell-shell structure synthesized through the process described above. It could be confirmed from the transmission electron microscope image that the particles further increased in size due to the formation of a second shell around the core-shell.

Figure 3D:
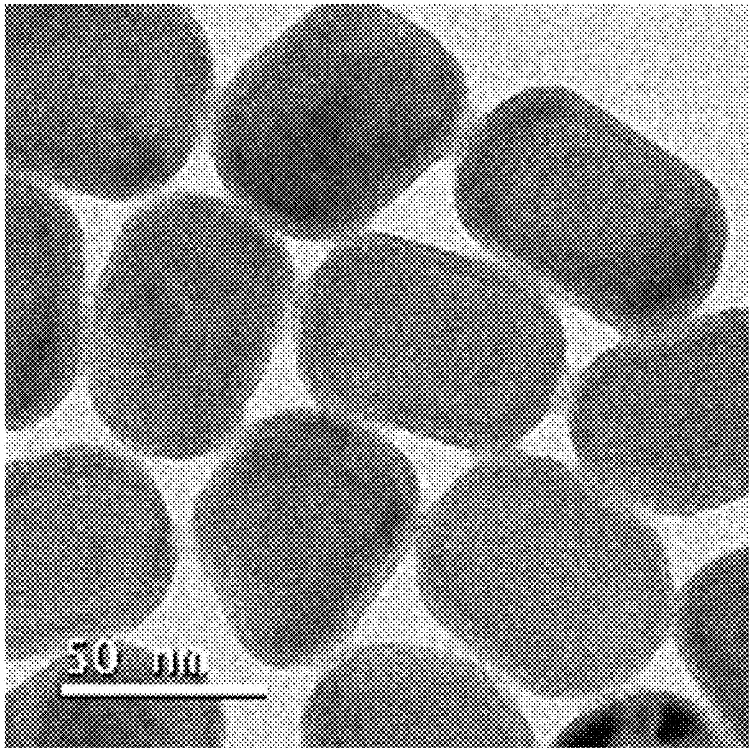

Then, according to an embodiment, upconversion nanophosphors with a core-shell-shell-shell structure are prepared (see FIG. 3D).

Using the $NaYF_4:Yb^{3+},Er^{3+}/NaYF_4:Nd^{3+},Yb^{3+}/NaYF_4$ nanoparticle prepared according to the embodiment in FIG. 3C as a core, a nanophosphor with a core-shell-shell-shell ($NaYF_4:Yb^{3+},Er^{3+}/NaYF_4:Nd^{3+},Yb^{3+}/NaYF_4/NaYbF_4:Tm^{3+}$) structure including a $NaYbF_4:Tm^{3+}$ compound was prepared.

The $NaYbF_4:Tm^{3+}$ compound prepared according to the embodiment in FIG. 3D may be understood as a compound of a chemical formula $NaYb_{0.995}F_4:Tm^{3+}{}_{0.005}$. First, about 2.985 mmol of ytterbium chloride hexahydrate ($YbCl_3 \cdot 6H_2O$) and about 0.015 mmol of thulium chloride hexahydrate ($TmCl_3 \cdot 6H_2O$) were mixed with a solution including oleic acid and 1-octadecene, and a mixed solution including a lanthanide complex was prepared by heat treatment at about 150° C. for about 30 minutes (first mixed solution preparation step).

The first mixed solution was mixed with a solution including $NaYF_4:Yb^{3+},Er^{3+}/NaYF_4:Nd^{3+},Yb^{3+}/NaYF_4$ nanoparticles prepared according to the embodiment in FIG. 3C to prepare a second mixed solution (second mixed solution preparation step).

About 30 ml of a methanol solution including about 7.5 mmol of sodium hydroxide and about 12 mmol of ammonium fluoride was prepared (third mixing solution preparation step), and then mixed into the second mixed solution including the lanthanide complex (reaction solution preparation step).

After being thoroughly mixed, methanol was removed and heat treated under an inert gas atmosphere. Preferably, the heat treatment temperature is about 200 to 370° C. and the heat treatment time is about 10 minutes to 4 hours (nanoparticle formation step).

After the heat treatment process and cooling to room temperature, nanophosphors in a colloidal state is obtained. The prepared nanophosphors were washed with acetone or ethanol and distributed in non-polar solvents such as hexane, toluene, and chloroform for storage.

FIG. 3D illustrated a transmission electron microscope image of the upconversion nanophosphors with the core-shell-shell-shell structure synthesized through the process described above. It could be confirmed from the transmission electron microscope image that the particles further increased in size due to the formation of a shell around the core-shell-shell.

Figure 3E:
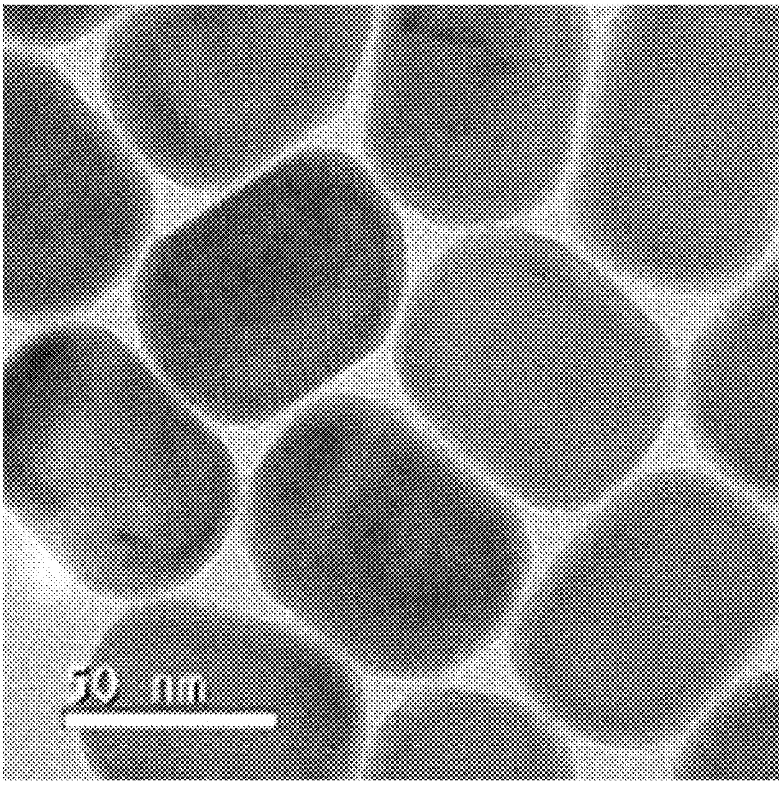

Then, according to an embodiment, upconversion nanophosphors with a core-shell-shell-shell-shell structure are prepared (see FIG. 3E).

Using the $NaYF_4:Yb^{3+},Er^{3+}/NaYF_4:Nd^{3+},Yb^{3+}/NaYF_4/NaYbF_4:Tm^{3+}$ nanoparticle prepared according to the embodiment in FIG. 3D as a core, a nanophosphor with a core-shell-shell-shell-shell ($NaYF_4:Yb^{3+},Er^{3+}/NaYF_4:Nd^{3+},Yb^{3+}/NaYF_4/NaYbF_4:Tm^{3+}/NaYF_4$) structure including $NaYF_4$ compound was prepared.

The compound prepared according to the embodiment in FIG. 3E may be understood as a compound of a chemical formula $NaYF_4$. First, about 1 mmol of yttrium chloride hexahydrate ($YCl_3 \cdot 6H_2O$) was mixed with a solution including oleic acid and 1-octadecene and heat treated at about 150° C. for about 30 minutes to prepare a mixed solution including a lanthanide complex (first mixed solution preparation step).

The first mixed solution was mixed with a solution including $NaYF_4:Yb^{3+},Er^{3+}/NaYF_4:Nd^{3+},Yb^{3+}/NaYF_4/NaYbF_4:Tm^{3+}$ nanoparticles prepared according to the embodiment in FIG. 3D to prepare a second mixed solution (second mixed solution preparation step).

About 10 ml of a methanol solution including about 2.5 mmol of sodium hydroxide and about 4 mmol of ammonium fluoride was prepared (third mixing solution preparation step), and then mixed into the second mixed solution including the lanthanide complex (reaction solution preparation step).

After being thoroughly mixed, methanol was removed and heat treated under an inert gas atmosphere. Preferably, the heat treatment temperature is about 200 to 370° C. and the heat treatment time is about 10 minutes to 4 hours (nanoparticle formation step).

After the heat treatment process and cooling to room temperature, nanophosphors in a colloidal state is obtained. The prepared nanophosphors were washed with acetone or ethanol and distributed in non-polar solvents such as hexane, toluene, and chloroform for storage.

FIG. 3E illustrated a transmission electron microscope image of the upconversion nanophosphors with the core-shell-shell-shell-shell structure synthesized through the process described above. It could be confirmed from the transmission electron microscope image that the particles further increased in size due to the formation of a shell around the core-shell-shell-shell.

FIG. 4 illustrates PL spectra under near-infrared excitation conditions of each wavelength for the upconversion nanoparticle with the core-shell-shell-shell-shell structure prepared according to the embodiment in FIG. 3.

Figure 4A:
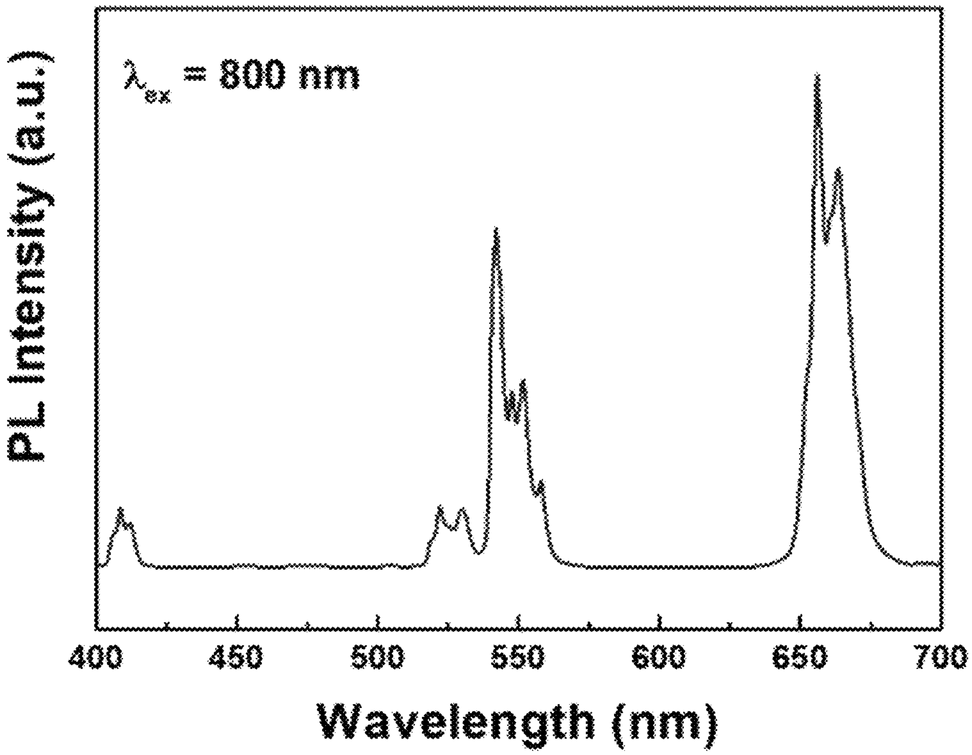
FIG. 4A is a PL spectrum of a nanoparticle with a core-shell-shell-shell-shell structure under 800 nm near-infrared excitation according to an embodiment of the present disclosure.

In FIG. 4A, it can be seen that the upconversion nanoparticle with core-shell-shell-shell-shell structure exhibit a strong light emission peak of green color under the near-infrared excitation condition of about 800 nm. The light emission intensity in the red spectrum is also strong, but taking into account the human eye sensitivity, it is observed as the light emission in green color.

Figure 4B:
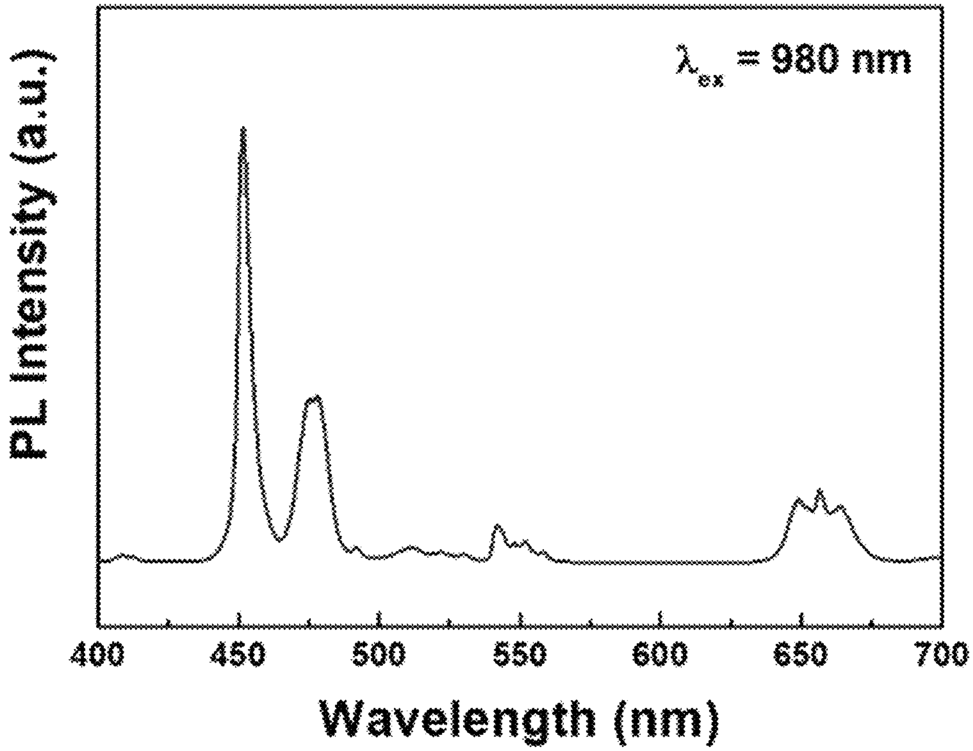
FIG. 4B is a PL spectrum of a nanoparticle with a core-shell-shell-shell-shell structure under 980 nm near-infrared excitation according to an embodiment of the present disclosure.

In contrast, in FIG. 4B, it can be seen that the upconversion nanoparticle with core-shell-shell-shell-shell structure exhibit the PL spectrum under the near-infrared excitation condition of about 980 nm, with a strong light emission peak of blue color. It can be seen that irradiation with lasers at about 800 nm and about 980 nm resulted in the light emission of green and blue colors, respectively.

Next, a mixed solution of an upconversion nanophosphor with light emission in red-green-blue colors is prepared.

A mixed solution of mixing the nanophosphor solutions prepared in FIGS. 1 and 3, respectively, was prepared. At this time, the nanophosphor solution prepared in FIG. 1 was diluted by about ½ and 0.5 mL thereof was taken, and the nanophosphor solution prepared in FIG. 3 was diluted by about ½ and about 1 mL thereof was taken and then mixed.

Figure 5A:
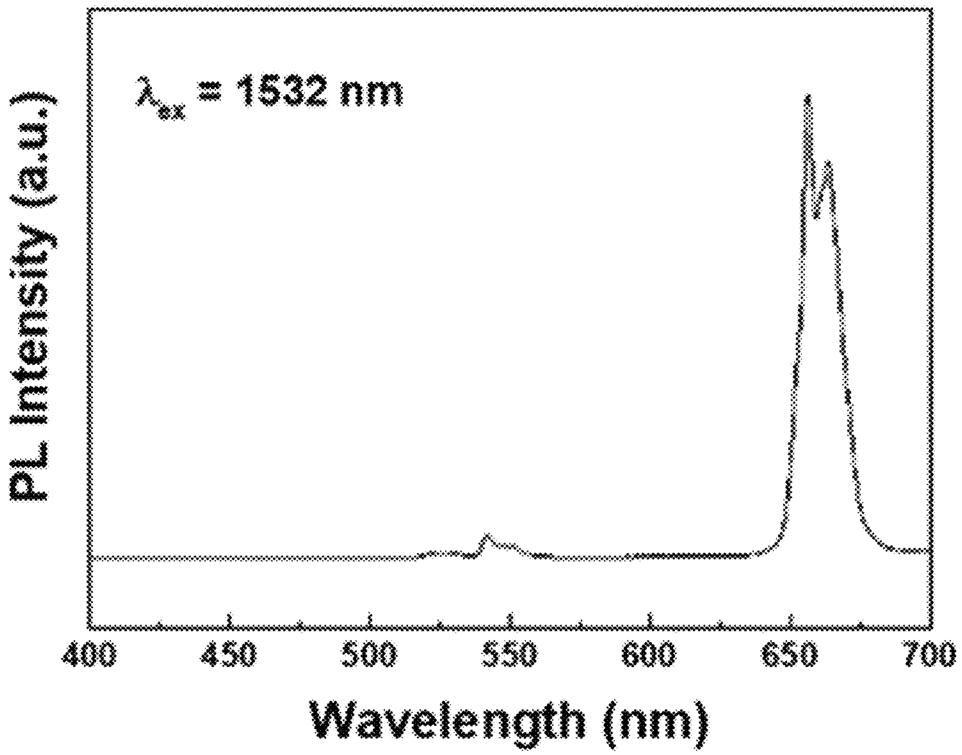
FIG. 5A is a PL spectrum of a mixed solution of nanoparticles under 1532 nm near-infrared excitation according to an embodiment of the present disclosure.
Figure 5B:
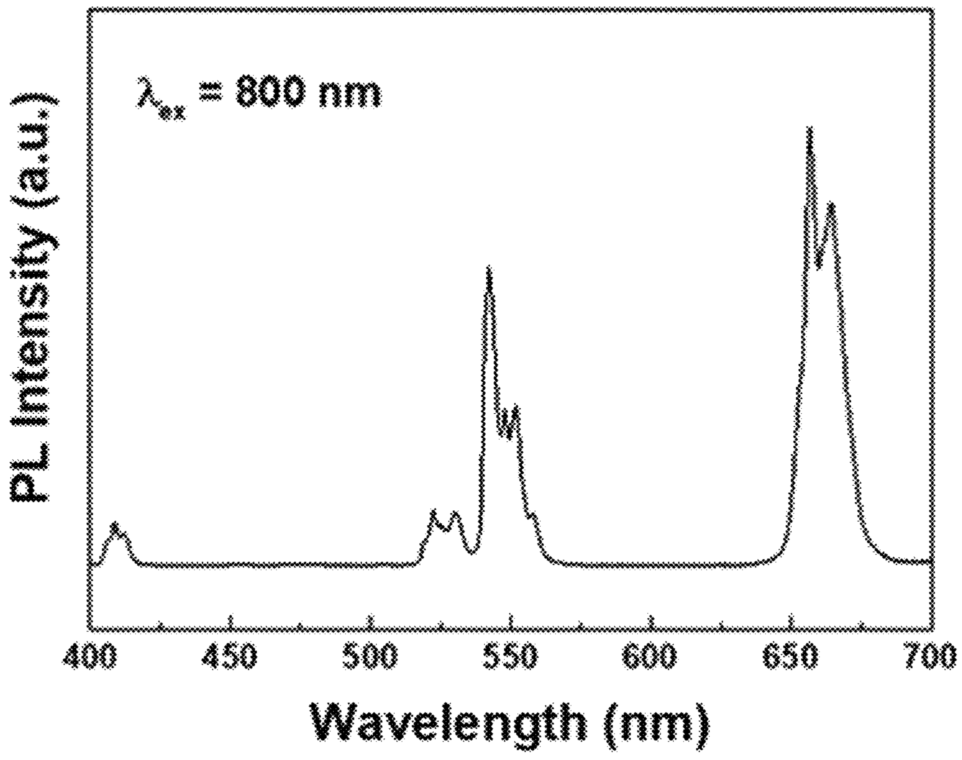
FIG. 5B is a PL spectrum of a mixed solution of nanoparticles under 800 nm near-infrared excitation according to an embodiment of the present disclosure.
Figure 5C:
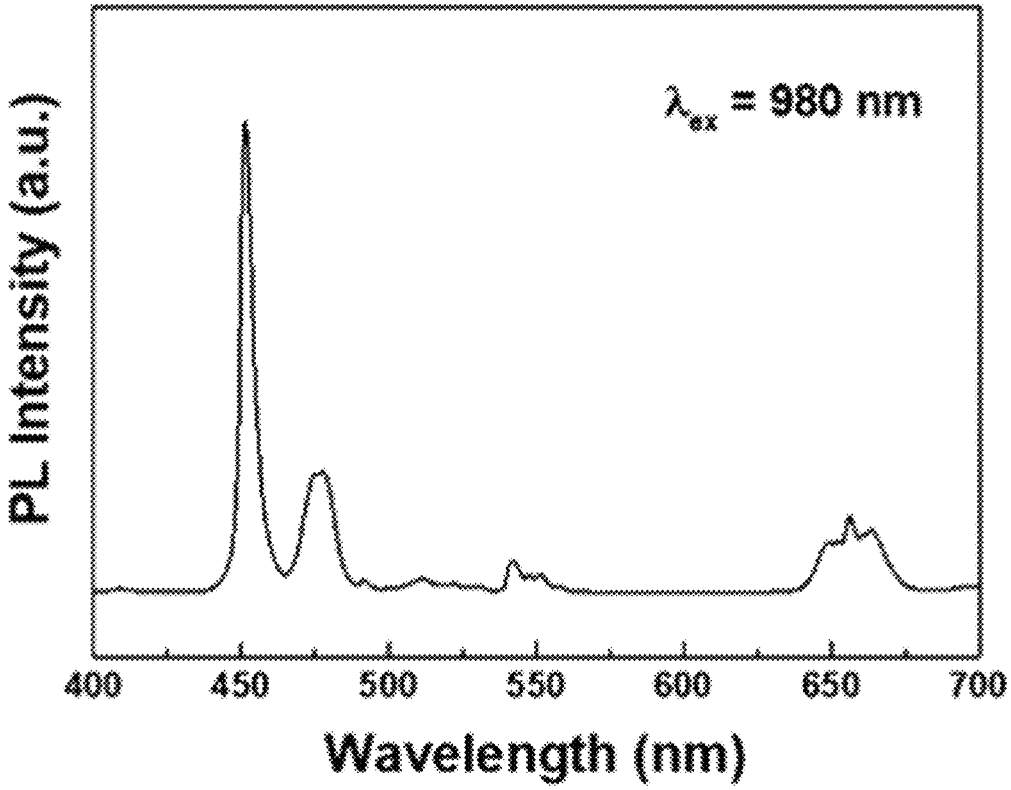
FIG. 5C is a PL spectrum of a mixed solution of nanoparticles under 980 nm near-infrared excitation according to an embodiment of the present disclosure.

FIG. 5 illustrates light emission spectra under near-infrared excitation for the prepared nanophosphor solution, and it was confirmed that the nanophosphor mixed solution prepared with reference to the embodiment in FIG. 5 can exhibit light emission in red, green, and blue colors, respectively, depending on the excitation wavelength of the applied laser.

Finally, an upconversion nanophosphor-polymer composite with light emission in red-green-blue colors is prepared.

The prepared mixed solution of the upconversion nanophosphors with light emission in red-green-blue colors was mixed with polydimethyl siloxane (PDMS) polymer to prepare a polymer composite.

Therefore, about 0.4 mL of the prepared nanophosphor mixed solution was mixed with about 10 mL of Sylgard 184 PDMS polymer and about 1 mL of a curing agent, and then heat treated at about 80° C. for about 1 hour to prepare a polymer composite.

The polymer composite according to an embodiment of the present disclosure may include an upconversion nanophosphor emitting light in red and blue colors represented by Chemical Formula 1 below and an upconversion nanophosphor emitting light in green and blue colors represented by Chemical Formula 2 below.

$$NaEr_{1-x}F_4:Tm_x/NaYF_4/NaYb_{1-y}F_4:Tm_y/NaYF_4 \quad \text{[Chemical Formula 1]}$$

Here, x is a real number selected from the range satisfying $0 \le x \le 0.3$ and y is $0 < y \le 0.3$.

$$NaY_{1-a-b}F_4{:}Yb_a,Er_b/NaY_{1-c-d}F_4{:}Nd_c,Yb_d/NaYF_4/NaYb_{1-e}F_4{:}Tm_e/NaYF_4 \quad \text{[Chemical Formula 2]}$$

Here, a is a real number selected from the range satisfying $0 < a \le 0.5$, b is a real number selected from the range satisfying $0 < b \le 0.4$, c is a real number selected from the range satisfying $0 < c \le 1.0$, d is a real number selected from the range satisfying $0 \le d \le 0.2$, where c and d are real numbers selected from the range satisfying $0 < c+d \le 1$, and e is a real number selected from the range satisfying $0 < e \le 0.3$.

Experimental results showed that, like the prepared nanophosphor solution, the upconversion nanophosphor-polymer composite exhibited light emission in green, blue, and red colors, respectively, when excited by near-infrared with peaks near 800 nm, 980 nm, and 1532 nm.

In addition, it can be seen that the nanophosphor-polymer composite emits light in green, blue, and red colors when three wavelengths of near-infrared are applied simultaneously, and the alphabet of different colors could be displayed by controlling positions of the applied lasers.

While the present disclosure has been described above with reference to the exemplary embodiments, it may be understood by those skilled in the art that the present disclosure may be variously modified and changed without departing from the spirit and scope of the present disclosure disclosed in the claims.

According to the present disclosure, a transparent polymer composite capable of exhibiting R/G/B light emission may be prepared by mixing upconversion nanoparticles exhibiting strong R/B light emission and G/B light emission into a polymer, from which a three-dimensional image may be realized.

In addition, a polymer film that includes nanoparticles exhibiting strong R/G light emission and G/B light emission is manufactured, which is applicable to the windshield of an automobile as a head up display (HUD). In this case, the polymer film uses a self-light emitting display method, which provides a wider viewing angle than the HUD with the current reflective display, thereby overcoming the disadvantage of needing to adjust the display position according to the driver's eye level.

What is claimed is:

1. An upconversion multicolor light-emitting polymer composite that absorbs infrared light to emit red, green, and blue colors at wavelengths in each specific region of infrared light spectrum comprising:

- a first upconversion nanophosphor that absorbs first infrared light to emit light in red color and absorbs second infrared light to emit light in blue color;
- a second upconversion nanophosphor that absorbs third infrared light to emit light in green color and absorbs the second infrared light to emit light in blue color; and
- a polydimethylsiloxane (PDMS) polymer.

2. The upconversion multicolor light-emitting polymer composite of claim 1, wherein the first upconversion nanophosphor comprises a first nanoparticle having a core-shell-shell-shell structure sequentially from a center of the first upconversion nanophosphor.

3. The upconversion multicolor light-emitting polymer composite of claim 2, wherein the first nanoparticle comprises:

- core exhibiting light emission in red color;
- a first shell being an optically inactive layer to surround the core;
- a second shell being a light emitting layer to surround the first shell and exhibit light emission in blue color; and
- a third shell being a crystalline layer to protect the second shell.

4. The upconversion multicolor light-emitting polymer composite of claim 1, wherein the second upconversion nanophosphor comprises a second nanoparticle having a core-shell-shell-shell-shell structure sequentially from a center of the second upconversion nanophosphor.

5. The upconversion multicolor light-emitting polymer composite of claim 4, wherein the second nanoparticle comprises:

- a core exhibiting light emission in green color;
- a first shell being an absorbing layer to absorb light in each specific wavelength region;
- a second shell being an optically inactive layer to surround the first shell;
- a third shell being a light emitting layer to surround the second shell and exhibit light emission in blue color; and
- a fourth shell being a crystalline layer to protect the third shell.

6. The upconversion multicolor light-emitting polymer composite of claim 1, wherein the first infrared light has a peak near 1532 nm, the second infrared light has a peak near 980 nm, and the third infrared light has a peak near 800 nm.

7. The upconversion multicolor light-emitting polymer composite of claim 1, wherein:

- the first upconversion nanophosphor is represented by Chemical Formula 1 below; and
- the second upconversion nanophosphor is represented by Chemical Formula 2 below, $$NaEr_{1-x}F_4{:}Tm_x/NaYF_4/NaYb_{1-y}F_4{:}Tm_y/NaYF_4 \quad \text{[Chemical Formula 1]}$$

where, x is a real number selected from the range satisfying $0 \le x < 0.3$ and y is $0 < y \le 0.3$, $$NaY_{1-a-b}F_4{:}Yb_a,Er_b/NaY_{1-c-d}F_4{:}Nd_c,Yb_d/NaYF_4/NaYb_{1-e}F_4{:}Tm_e/NaYF_4 \quad \text{[Chemical Formula 2]}$$

where, a is a real number selected from the range satisfying $0 < a \le 0.5$, b is a real number selected from the range satisfying $0 < b \le 0.4$, c is a real number selected from the range satisfying $0 < c \le 1.0$, d is a real number selected from the range satisfying $0 \le d \le 0.2$, where c and d are real numbers selected from the range satisfying $0 < c+d \le 1$, and e is a real number selected from the range satisfying $0 < e \le 0.3$.

8. A transparent display comprising the upconversion multicolor light-emitting polymer composite according to claim 1.

9. A method of preparing an upconversion multicolor light-emitting polymer composite, comprising:

- preparing a first upconversion nanophosphor solution that absorbs infrared light to emit light in red and blue colors at wavelengths in each specific region;
- preparing a second upconversion nanophosphor solution that absorbs the infrared light to emit light in green and blue colors at wavelengths in each specific region;
- preparing a mixed solution by mixing the prepared first upconversion nanophosphor solution with the second upconversion nanophosphor solution; and
- mixing the prepared mixed solution with a polydimethylsiloxane (PDMS) polymer.

10. The method of claim 9, wherein the preparing of the first upconversion nanophosphor solution comprises:

- creating a core exhibiting light emission in red color;
- creating a first shell being an optically inert layer to surround the core;

creating a second shell being a light emitting layer to surround the first shell and exhibit light emission in blue color; and creating a third shell being a crystalline layer to protect the second shell.

11. The method of claim 9, wherein the preparing of the second upconversion nanophosphor solution comprises:

creating a core exhibiting light emission in green color;

creating a first shell being an absorbing layer to absorb wavelengths in each specific region;

creating a second shell being an optically inactive layer to surround the first shell;

creating a third shell being a light-emitting layer to surround the second shell and exhibit light emission in a blue color; and creating a fourth shell being a crystalline layer to protect the third shell.

12. The method of claim 9, wherein the preparing of the first upconversion nanophosphor solution further comprises:

diluting the prepared first upconversion nanophosphor solution by ½.

13. The method of claim 9, wherein the preparing of the second upconversion nanophosphor solution further comprises:

diluting the prepared second upconversion nanophosphor solution by ½.

14. The method of claim 9, wherein the preparing of the mixed solution further comprises:

mixing the first upconversion nanophosphor solution with the second upconversion nanophosphor solution in a 1:2 ratio.

15. The method of claim 9, wherein in the preparing of the mixed solution, a first upconversion nanophosphor represented by Chemical Formula 1 below is mixed with a second upconversion nanophosphor represented by Chemical Formula 2 below, $$NaEr_{1-x}F_4{:}Tm_x/NaYF_4/NaYb_{1-y}F_4{:}Tm_y/NaYF_4 \qquad \text{[Chemical Formula 1]}$$

where, x is a real number selected from the range satisfying $0 \le x < 0.3$ and y is $0 < y \le 0.3$, $$NaY_{1-a-b}F_4{:}Yb_a,Er_b/NaY_{1-c-d}F_4{:}Nd_c,Yb_d/NaYF_4/NaYb_{1-e}F_4{:}Tm_e/NaYF_4 \qquad \text{[Chemical Formula 2]}$$

where, a is a real number selected from the range satisfying $0 < a \le 0.5$, b is a real number selected from the range satisfying $0 < b \le 0.4$, c is a real number selected from the range satisfying $0 < c \le 1.0$, d is a real number selected from the range satisfying $0 \le d \le 0.2$, where c and d are real numbers selected from the range satisfying $0 < c+d \le 1$, and e is a real number selected from the range satisfying $0 < e \le 0.3$.

* * * * *